Jan. 11, 1944.     C. LOSE, JR     2,339,084
FILTER BED FILTRATION WITH FILTER BED CLEANING
Filed Oct. 4, 1940      2 Sheets-Sheet 1

INVENTOR
CHARLES LOSE, JR.
BY Louis L. Amarto
his ATTORNEY

Jan. 11, 1944.      C. LOSE, JR      2,339,084
FILTER BED FILTRATION WITH FILTER BED CLEANING
Filed Oct. 4, 1940       2 Sheets-Sheet 2

INVENTOR
CHARLES LOSE, JR.
BY
ATTORNEY

Patented Jan. 11, 1944

2,339,084

UNITED STATES PATENT OFFICE 2,339,084

FILTER BED FILTRATION WITH FILTER BED CLEANING

Charles Lose, Jr., Cranford, N. J.

Application October 4, 1940, Serial No. 359,657

7 Claims. (Cl. 210—128)

This invention relates to filter-bed filtration with filter bed cleaning and more particularly to improved filtration apparatus including granular filter beds and means for cleaning such filter beds to enable continuous operation.

Heretofore, solid-bearing liquids, such as sewage, have been passed through settling apparatus and then supplied to filtration means comprising one or more filter channels or tanks provided with granular filter beds and these filter beds have been kept sufficiently clean for substantially continuous service by use of suitable cleaners adapted to clean portions of filter beds directly thereunder and to be moved from a cleaned area of the bed to another area without any substantial interference with continuous operation of the filter beds. Also in some forms of such apparatus, settling has been effected in a round clarification tank or basin and the liquid partly clarified by such sedimentation has been passed from the central tank into an annular filter channel or tank surrounding said clarification basin or tank and divided by a granular filter bed into an upper or influent section and a lower effluent or filtered liquid section, thus providing a filter bed arrangement making it very convenient to clean the filter by means of a filter bed cleaner which may travel around the tank, cleaning successive portions of the filter bed as it travels along the same.

An important object of the invention is to provide improved filter-bed filtration apparatus of the general character to which reference has been made. Another object is to provide improved methods of granular filter-bed filtration. A further object is to provide for greater flexibility of operation of filtration apparatus of the type in which use is made of annular filter beds, said filter bed cleaners to travel over said filter beds. Another object is to provide improved filter bed cleaning means.

According to an approved embodiment of the invention, there may be a plurality of concentric filter beds arranged around a central area provided with a central support for one end of a bridge adapted to rotate about said support and to move individual cleaners along said concentric filter beds, said cleaners being preferably submerged (see Figs. 4, 5 and 6) to avoid the building up of a front wave and the resulting disturbance of the surface of the liquid. With certain features of the invention, the presence or absence of a clarification basin in said central area may be immaterial whereas other features may relate to arrangements in which there is no central basin but a central island and the radius of the innermost filter channel may be as short as is practicable without interfering with the use of a travelling cleaner in such channel. This arrangement gives a compact form of multiple bed filter and one in which the filter beds may readily be cleaned.

There may be a separate cleaner for each circular bed or section and each cleaner may be made effective or ineffective as desired. The liquid to be filtered may be supplied to the filter bed channels in any desired manner. For example when two concentric filter bed channels are arranged close together, the inner filter chamber may be supplied with liquid from a supply channel just at the inner side thereof and the outer chamber may be supplied with liquid from a supply channel just at the outer side thereof. Dirty water or wash water from the cleaners may be transferred inwardly along the bridge and discharged into an annular dirty water channel and then discharged from the said central area and then discharged from the channel in any suitable manner. Water for use in the cleaners may be drawn from another annular channel in the island. The filter beds may be cleaned separately or at the same time.

Other objects, features and advantages will appear upon consideration of the following detailed description and of the drawings in which.

Figure 1:
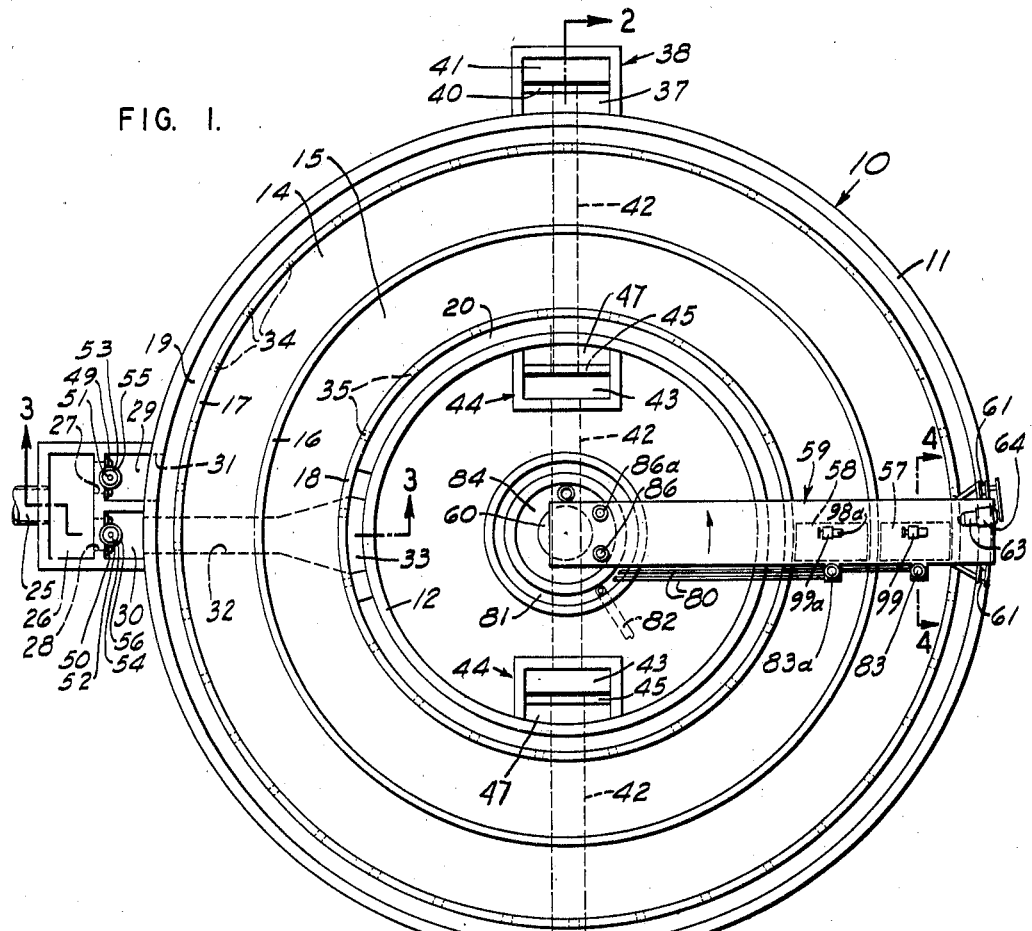
Fig. 1 is a top plan view of one embodiment of the invention.
Figure 2:
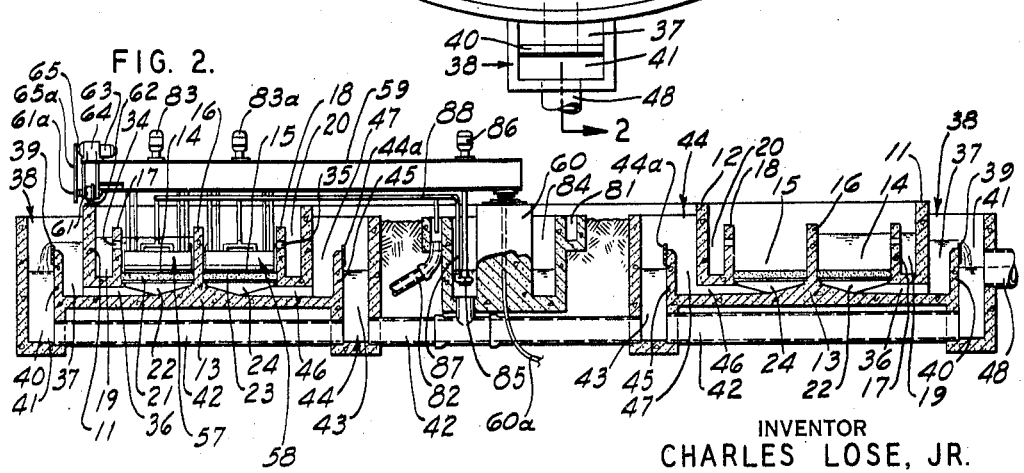
Fig. 2 is a section taken along the line 2—2 of Fig. 1 but with the bridge turned through 90° from its Fig. 1 position.

In the drawings, there is illustrated, more particularly in Figs. 1 and 2, apparatus comprising an annular main tank 10 having an outer wall 11, an inner wall 12 and a bottom 13. Inside the main tank 10 are two annular filter channels 14 and 15 separated from each other by a common separating wall 16 and having at their other sides, walls 17 and 18 respectively providing an annular influent channel 19 between the wall 17 and the outer main wall 11, and another annular influent channel 20 between the wall 18 and the main inner wall 12. The annular filter channel 14 is divided by a filter bed 21 of granular material, such as sand, into an upper influent portion and a lower annular chamber 22 receiving the filtered effluent, and in the filter channel 15 there is a similar filter bed 23 with a lower filtered effluent chamber 24.

Figure 3:
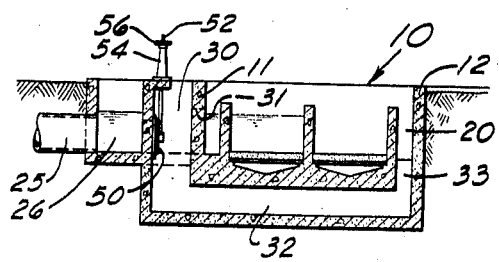
Fig. 3 is a section taken along the line 3—3 of Fig. 1.

The influent, which may be sewage clarified by sedimentation, may be supplied through a duct or pipe 25 to a box or chamber 26 at one side of the main tank 10 and may pass through openings 27 and 28 into chambers 29 and 30 respectively, the chamber 29 being connected with the influent channel 19 through an opening 31 in the wall 11 and the lower part of the chamber 30 which extends below the tank bottom 13, being connected by a low-level duct 32 to the lower end of a duct 33 connected with the bottom of the inner influent channel 20. (Figs. 1 and 3.) From the influent channel 19, the liquid may pass into the filter channel 14 through openings or ports 34 in the wall 17, which ports are suitably distributed around the wall 17. In the same general manner, liquid may pass from the influent channel 20 into filter channel 15 through openings or ports 35 in the wall 18.

As illustrated in Fig. 2, the filtered effluent passes from the effluent channel 22 through ducts 36 into compartments 37 of boxes 38 and flows over weirs 39 at the tops of walls 40 into compartments 41 of said boxes. Said compartments 41 are connected at their bottoms with a pipe or duct 42 which may also be connected with the bottoms of compartments 43 of boxes 44 similar to boxes 38, the compartments 43 receiving over weirs 44a, at the tops of overflow walls 45, filtered effluent passing from effluent channel 24 through ducts 46 into compartments 47 separated from compartments 43 by the overflow walls 45. The filtered effluent may be discharged from the apparatus through a pipe 48 connected with one of the compartments 41 in a corresponding box 38.

Both filter beds may be kept in continuous operation at the same time and may be cleaned as required or they may be used separately and cleaned when desired. If only one filter bed is to be used the flow to the other may be cut off. Such control of the flow to the filter beds may be effected by gates 49 and 50 slidable across the outlet ends of passages 27 and 28 (left of Figs. 1 and 3) under control of rods 51 and 52, rotatably mounted in brackets 53 and 54 and supported by heads 55 and 56 resting on the tops of said brackets, the lower parts of said rods having screw-thread connections with lugs fixed to said gates or slides 49 and 50 respectively.

The cleaning of the filter beds 21 and 23 may be effected by any suitable cleaning devices arranged to travel therealong, but the novel form of cleaning means disclosed on the drawings is particularly advantageous for the purpose. As disclosed in the drawing, there are two cleaning devices 57 and 58, one for each of the filter beds 21 and 23 and these devices are carried by a bridge 59 supported at its inner end on a column 60 in a central space or island enclosed by the main tank, and at its outer end by two wheels 61 resting on rail or track 62 on the wall 11.

The bridge 59 may be driven about the column 60 by actuating one of the wheels 61 by means carried on the bridge 59 and including an electric motor 63, a speed reducer 64 having a driving shaft 65, and a sprocket chain 65a connecting a sprocket wheel on the shaft 65 with a sprocket wheel on a shaft 61a of one of the driven wheels 61. Electric power for operating the motor 63 may be supplied through a cable 60a extending axially through the central column 60 and connected with the motor 63 through suitable slip ring connections (not shown) between the bridge 59 and the column 60.

The two filter bed cleaners 57 and 58 may be similar. A preferred form of filter bed cleaner 57 is illustrated in Figures 4, 5, 6 and 7 as suspended from the bridge 59 over the filter bed 21. This cleaning device 57 comprises a chamber or caisson 66 having side walls 67 and front and rear walls 68 and 69 respectively, the forward wall 68 being provided with an upwardly turned lip 70 to guide material beneath such wall 68 into the caisson 66. The rear wall 69 may be provided with a flap 71 to form a seal with the filter bed and to smooth the granular material which has just been cleaned.

Cleaning of the filter bed material beneath the caisson 66 may be effected by means similar in many respects to those disclosed in my copending application Serial No. 329,026, filed April 11, 1940. Such means for agitating and cleaning sand in the caisson 66 may comprise a manifold 72 to which water is supplied under pressures and from which water is forced downwardly through pipes 73 to hollow cleaner teeth 74 preferably arranged substantially vertically. The liquid is directed upwardly through a nozzle 75 in each tooth so as to draw sand from the bottom of the filter bed into the tooth and force it upwardly to and out of the top of the tooth. As the granular material or sand passes out of the top of the tooth it may be deflected rearwardly by means of a deflector or finger 76 to fall to the surface of the bed behind the tooth.

Figure 4:
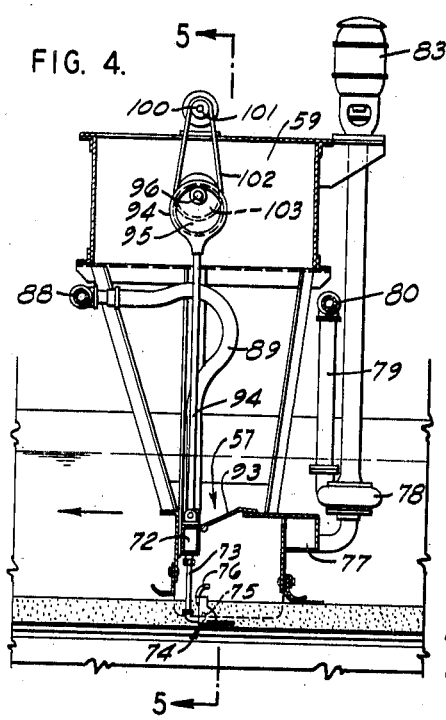
Fig. 4 is a section taken along the line 4—4 of Fig. 1 showing details of the apparatus on a larger scale.

In passing upwardly through the teeth and through the liquid in the caisson 66 the sand is cleaned, leaving the removed solids and other waste material in the dirty water in said caisson. This dirty water may pass through openings in the upper part of the rearward wall 69 into a collecting compartment 77 from which it may be removed by means of a pump 78 and discharged through an upwardly extending pipe 79 into a generally horizontal pipe 80 which leads toward the inner end of the bridge where it discharges into an annular channel 81 surrounding the central column 60. Dirty water thus collected in the channel 81 may be discharged therefrom to any suitable location through a pipe 82. The pump 78 may be arranged with its axis vertical and may be suspended from the bridge 59 as illustrated in Figure 4, the pump being driven by means of an electric motor 83 having a driving connection with the shaft of the pump 78.

Figure 5:
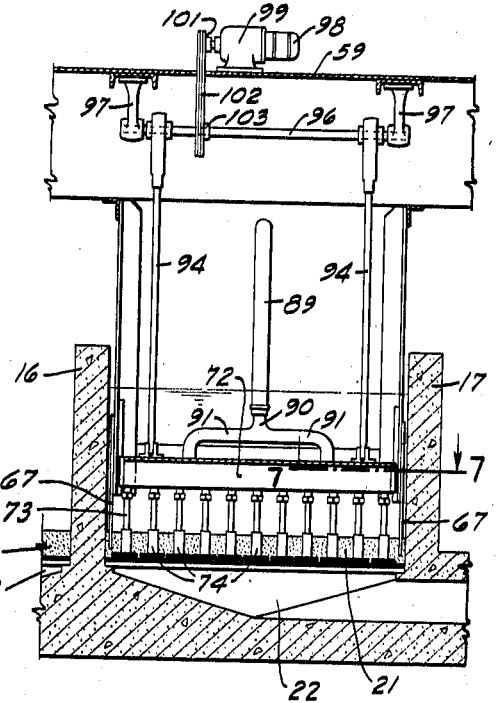
Fig. 5 is a section taken on the line 5—5 of Fig. 4.
Figure 6:
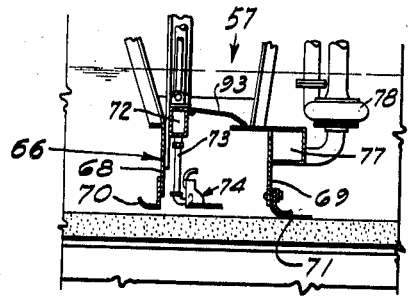
Fig. 6 is a view similar to the lower part of Fig. 4 but showing the parts in different relative positions.

In order to furnish liquid under pressure to the manifold 72 there may be provided an annular channel 84 arranged around the central column 60 and, as shown in Figure 2, lying within the area enclosed by the annular discharge channel 81. At one point in its circumference, the channel 84 is connected with the effluent pipe 42 so that filtered liquid will be supplied to the lower part of the annular channel 84. Located in the channel 84 is a pump 85 suspended from the bridge and driven by a motor 86 vertically above the same. From the pump 85 the filtered liquid may be passed upwardly through a pipe 87 to a generally horizontal pipe 88 through which it flows to a position substantially over the caisson 66. From the pipe 88 the liquid is passed through a flexible tube or hose 89 to the manifold 72, thus providing for the supply of liquid under pressure to the manifold without interfering with the upward and downward movement thereof. Preferably as shown in Figure 5, the flexible hose 89 is connected at its discharge end with a pipe 90 having branches 91 extending towards opposite ends of the manifold 72 to which they are connected.

Figure 7:
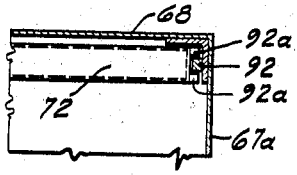
Fig. 7 is a section taken on the line 7—7 of Fig. 5.

Inasmuch as it may be desired to clean only one of the filter beds at a time, means may be provided for raising the manifold 72 and the teeth 74 suspended therefrom, to such a height that the cleaner will become ineffective. In order to provide for such upward and downward movement of the manifold 72 and the teeth supported thereby, the manifold is provided at its ends with projections 92 moving in a groove between vertical guides 92ª (Figure 7). This arrangement enables upward and downward movement of the manifold 72 while maintaining guiding control thereof. Furthermore, in order to permit the upward and downward movement of the manifold 72, the top of the caisson 66 which as illustrated is submerged, may be formed with a flap 93 pivotally hinged to the manifold 72 and resting on the stationary part of the roof of the caisson. This arrangement enables the upward and downward movement of the manifold and the teeth supported thereby without interfering with the function of the flap 93 which serves to keep the top of the caisson closed either in the position shown in Figure 4 or in the position shown in Figure 6, due to height of side walls 67. The submergence of the cleaners tends to minimize surface disturbance of the liquid about to be filtered.

The raising and lowering of the manifold 72 may be effected by means of rods 94 pivotally connected at their lower ends to the manifold 72 and connected at their upper ends, by means of eccentric straps, to eccentrics 95 fixed on a horizontal shaft 96 journaled in brackets 97 carried by the bridge 59. Movement of the shaft 96 through 180° may move manifold 72 from its lowest level to its highest level or vice versa. Operation of the shaft 96 may be effected by means of a motor 98 connected through a speed reducer 99 to a shaft 100 carrying a sprocket wheel 101 and the sprocket chain 102 connecting sprocket wheel 101 to a sprocket wheel 103 on shaft 96. As a result of the use of a suitable speed reducer 99, it will be easy to control the motor so as to stop the eccentrics in their raised or lowered positions. The raising and lowering means just described is similar in many respects to the corresponding means disclosed in my said prior application Serial No. 329,026.

The cleaner 58 is similar to cleaner 57 and dirty water in cleaner 58 is drawn therefrom by means including a pump (not shown) driven by a motor 83a, and is delivered to pipe 80 through which it is discharged into channel 81 connected to discharge pipe or duct 82. The raising and lowering of the manifold and teeth in cleaner 58 may be effected by means of a motor 98a acting through a suitable speed reducer 99a.

The liquid to be filtered is supplied to the apparatus through the pipe 25 and passes from this pipe into the box or chamber 26 from which it may flow into either one or both of the chambers 29 and 30 through openings 27 and 28 which may be closed by slidable gates 49 and 50.

While filter bed 21 is in use, the liquid passes from the chamber 29 into the outer influent channel 19 and through ports 34 in the wall 17, into the outer filter channel 14. The liquid supplied to the filter channel passes downwardly through filter bed 21 into the chambers 22 at opposite sides of the main tank and through ducts 36 to compartments 37 of chambers or boxes 38, and is discharged from compartments 37 over weirs 39 into compartments 41 of said boxes 38. The bottoms of said boxes 38 are connected by a duct or pipe and the filtered liquid may be discharged from the apparatus through pipe 48 connected to one of said compartments 41.

While filter bed 23 is in use, liquid passes from the bottom of chamber 30 through a duct 32, beneath the filter channels 14 and 15, and therefrom to the inner influent channel 20. From the channel 20 the liquid passes through ports 35 into inner filter channel 15 and through filter bed 23, chamber 24 and duct 46 into compartments 47 of boxes 44. From compartments 47 the liquid is discharged over weirs 44a into compartments 43 connected to the pipe 42 which connects boxes 38, so that the filtered liquid may pass to and be discharged through pipe 48.

Both filter beds or only one of them may be used as required. Also either filter bed can be cleaned while in use. Assuming that only the outer filter bed 21 is to be cleaned, gate 49 would be open and gate 50 would be closed and unless the filter bed 21 were being cleaned, both manifolds 72 would be in raised positions with the lower ends of the corresponding teeth above the upper surfaces of the filter beds so as to avoid unnecessary disturbance of the granular material or sand. In order to start cleaning filter bed 21, motor 98 would be operated to lower manifold 72 and teeth 74 of cleaner 57 to their Fig. 4 positions, motor 63 would be put into operation to move the bridge about the central column 60, motor 86 would be started to actuate pump 85 and pass liquid to the teeth 74 of cleaner 27, and motor 83 would be started to withdraw the dirty water from the cleaner 57. Upon completion of the cleaning operation the various pumps would be stopped as required and the teeth lifted from the filter bed.

Obviously, in cleaning the filter bed 23 alone, the operation would correspond to that followed in cleaning filter bed 21. It will also be obvious that both filter beds may be cleaned at the same time. If desired, either filter bed might be cleaned while the flow of liquid thereto is shut off. Furthermore any desired number of concentric filter beds may be used with corresponding changes in the arrangement.

Inasmuch as the two cleaning devices or cleaners 57 and 58 are driven around the apparatus at the same time, the provision for lifting the sets of teeth 74 entirely out of the filter beds is of substantial value. For example, if only one filter bed is to be cleaned the teeth 74 associated with the other bed may be lifted above the same so that in their travel they will not stir up the bed and also less power will be required to move the bridge 59. Furthermore, the lifting of the teeth entirely out of the filter beds will cause granular and other material in the teeth to be drawn therefrom so that the teeth will be relatively clean at the time they are lowered for use in another cleaning operation.

It should be understood that various features may be changed and that certain features may be used without others, without departing from the true spirit and scope of the invention.

What I claim is:

1. In a filtration apparatus, in combination, a plurality of concentric filter channels, annular filter beds of granular material one for each filter channel dividing it into an upper influent-receiving portion and a lower effluent chamber, means for supplying liquid to the influent-receiving portions of said filter channels, means for withdrawing filtered effluent including a filtered effluent duct connected to all of said lower effluent chambers, means for shutting off the flow of liquid through any of said filter beds not to be used, traveling cleaners individual to said beds to enable independent cleaning thereof, nozzle devices in said cleaners, an annular wash-liquid-supply channel connected to the filtered effluent duct and concentric with said filter channels, an annular wash-liquid-discharge channel, means for selectively supplying to the nozzle devices of said cleaners under pressure liquid drawn from said wash-liquid-supply channel, and means for selectively drawing dirty liquid from said cleaners and discharging it into said annular wash-liquid-discharge channel.

2. In a filtration apparatus, in combination, a plurality of concentric filter channels, annular filter beds of granular material one for each filter channel dividing it into an upper influent-receiving portion and a lower effluent chamber, means for supplying liquid to the influent-receiving portions of said filter channels, means for withdrawing filtered effluent from said lower effluent chambers, a bridge pivoted at the common axis of said filter channels, means for supporting the outer end of said bridge and operating the same to turn it about said axis, an annular discharge channel around said axis and provided with a discharge pipe, traveling filter bed cleaners connected with said bridge and adapted to clean the granular material of the bed and leave the removed solids in dirty water in the cleaners, and means for pumping the dirty water from the cleaners, passing it along the bridge and discharging it into said annular discharge channel.

3. In a filtration apparatus, in combination, two concentric filter channels with granular filter beds dividing them into upper influent-receiving portions and lower effluent channels, means for supplying influent to said influent-receiving portions, weirs individual to said channels over which the effluent flows from the effluent channels, chambers into which said effluent flows from the weirs, a duct receiving effluent from the last-mentioned chambers, traveling filter-bed cleaners one over each of said beds, said cleaners using liquid under pressure, an annular wash-liquid channel at the inner side of the inner filter bed and connected to said duct, means for supplying liquid from said wash-liquid channel under pressure to said cleaners, and means for discharging dirty liquid from the apparatus including an annular dirty-liquid channel at the inner side of the inner filter bed and means for withdrawing dirty liquid from said cleaners and discharging it into said dirty liquid channel.

4. In a filtration apparatus, in combination, a plurality of concentric filter channels arranged around an island, annular filter beds of granular material one for each filter channel dividing it into an upper influent-receiving portion and a lower effluent chamber, means for discharging effluent from said effluent chambers to the outside of said apparatus, means for supplying liquid to the influent-receiving portions of said filter channels including influent channels adjacent to said filter channels and discharging into the influent-receiving portions of the corresponding filter channels, means for selectively supplying liquid to said influent channels from a supply outside of said concentric filter channels including for each influent channel at the inner side of the outermost filter channel a duct passing beneath said outermost filter channel, selectively actuable traveling cleaners one for each of said filter beds cleaning waste material from the granular material and leaving it in dirty liquid in the container, and means for removing the dirty water from the cleaners including an annular discharge channel in said island and selective means for drawing dirty liquid from said cleaners and discharging it into said discharge channel.

5. In a filtration apparatus, in combination, two concentric filter bed channels, filter beds of granular material dividing said filter channels into upper influent-receiving portions and lower effluent chambers, means for discharging to the outside of the apparatus effluent received in said effluent chambers, a supply channel at the outer side of the outer filter bed communicating with the influent-receiving portion thereof, a supply channel at the inner side of the inner filter bed communicating with the influent-receiving portion thereof, a supply chamber for liquid to be filtered located outside of the outer filter channel, a passage leading from said supply chamber to the outer supply channel, a passage leading from said supply chamber beneath the filter channels to the inner supply channel, means for cleaning the filter beds, an effluent discharge duct extending across the bottom of the apparatus beneath the effluent chambers, weir-controlled connections from each effluent channel to said effluent discharge duct, and means for discharging effluent from said duct.

6. A traveling filter bed cleaner comprising an open-bottom caisson having a front wall, a rear wall, a top member fixed with respect to said front wall and extending rearwardly therefrom part way toward said rear wall, and side walls; a pressure fluid manifold at the inner face of said rear wall; sand-cleaning teeth supported by said manifold and receiving fluid therefrom, said manifold being movable relatively to said caisson downwardly to position the lower ends of said teeth substantially at the bottom of a granular filter bed being cleaned and upwardly from such lowermost position; a flap hinged to said manifold and resting on said top member so as to maintain a closed top for the caisson as the manifold is raised and lowered; and means for removing dirty liquid from said caisson.

7. A traveling filter bed cleaner comprising an open-bottom caisson having a front wall, a rear wall, a top member fixed with respect to said front wall and extending rearwardly therefrom part way toward said rear wall, and side walls extending above said top member; a pressure fluid manifold at the inner face of said rear wall; said cleaning teeth supported by said manifold and receiving fluid therefrom; said manifold being movable relatively to said caisson downwardly below said top member to position the lower ends of said teeth substantially at the bottom of a granular filter bed being cleaned and upwardly above said top member between the upper parts of said side walls; and a flap hinged to said manifold and resting on said top member so as to maintain a closed top for the caisson as the manifold is raised and lowered, the forward part of said flap being inclined downwardly to permit the forward edge of said flap to rest on said top portion while the manifold is at a lower level than said top portion.

CHARLES LOSE, Jr.